US012583145B2

(12) United States Patent
Moraes

(10) Patent No.: US 12,583,145 B2
(45) Date of Patent: Mar. 24, 2026

(54) ROUTER ATTACHMENT ADAPTOR AND COVER FOR SAME

(71) Applicant: Josue dos Santos Moraes, Batavia, IL (US)

(72) Inventor: Josue dos Santos Moraes, Batavia, IL (US)

(73) Assignee: BAM IP Holding LLC, Saint Charles, IL (US)

(*) Notice: Subject to any disclaimer, the term of this patent is extended or adjusted under 35 U.S.C. 154(b) by 286 days.

(21) Appl. No.: 18/360,927

(22) Filed: Jul. 28, 2023

(65) Prior Publication Data

US 2025/0033237 A1 Jan. 30, 2025

(51) Int. Cl.
*B27C 5/10* (2006.01)

(52) U.S. Cl.
CPC .................................... *B27C 5/10* (2013.01)

(58) Field of Classification Search
CPC ..................................................... B27C 5/10
See application file for complete search history.

(56) References Cited

U.S. PATENT DOCUMENTS 4,143,691 A 3/1979 Robinson
4,319,615 A 3/1982 Ditmanson
4,685,496 A 8/1987 Livick
4,977,938 A 12/1990 Greeson
5,052,454 A 10/1991 Meinhardt
5,715,880 A 2/1998 Tucker et al.
6,305,447 B1 10/2001 Rousseau
6,505,659 B1 1/2003 Hummel
6,520,224 B2 2/2003 Smith
7,066,695 B1 * 6/2006 Nuss ......................... B27C 5/10
144/136.95
7,089,978 B2 8/2006 Karkosch et al.
9,399,307 B2 7/2016 Sommerville et al.
9,726,469 B2 8/2017 Adkins et al.
11,173,624 B2 * 11/2021 Hall .......................... B27C 5/10
2003/0113180 A1 6/2003 Schelberg et al.
2004/0182476 A1 9/2004 Karkosch et al.
2005/0072491 A1 4/2005 Baber
2005/0279424 A1 12/2005 Rosendahl
2006/0037667 A1 2/2006 Karkosch et al.
2006/0086425 A1 4/2006 Hyde
2006/0157155 A1 7/2006 Robinson
(Continued)

FOREIGN PATENT DOCUMENTS

DE 100 26 028 A1 11/2001
EP 0469344 A1 2/1992
(Continued)

OTHER PUBLICATIONS

Trend Routing Technology; 2002 Routing Catalogue; 2002; 5 pages.
(Continued)

*Primary Examiner* — Matthew Katcoff
(74) *Attorney, Agent, or Firm* — Reinhart Boerner Van Deuren P.C.

(57) ABSTRACT

An attachment for a router is provided. The attachment may be an adaptor for easily connecting the router to another component. The attachment includes a frame arrangement and a bottom cover that covers the mounting portion of the frame arrangement used to secure the attachment to the router.

21 Claims, 6 Drawing Sheets

(56) References Cited

U.S. PATENT DOCUMENTS

| | | | |
|---|---|---|---|
| 2006/0191595 | A1 | 8/2006 | Stoffel |
| 2009/0050236 | A1 | 2/2009 | Thorson et al. |
| 2010/0206430 | A1 | 8/2010 | Pozgay et al. |

FOREIGN PATENT DOCUMENTS

| | | | |
|---|---|---|---|
| EP | 0469538 | A1 | 2/1992 |
| EP | 0545142 | A1 | 6/1993 |
| EP | 0546376 | A1 | 6/1993 |
| WO | WO 90/03248 | A1 | 4/1990 |

OTHER PUBLICATIONS

Bosch Industrial Shop Router, Model 0601617739; Jul. 1998; 2 pages; Robert Bosch Tool Corporation.
Bosch Consumer Information; manual; May 20, 2003; 68 pages; Robert Bosch Tool Corporation.
Festool; So Schnell Gibt's Keine Bessere!; Obefräse OF 1400—setzt neue Maßstäbe in ihrer-Klasse, Werkzeuge Für höchste Ansprüche; brochure; Feb. 2004; 4 pages; TTS Systems AG & Co., Wendlingen, DE.

* cited by examiner

ROUTER ATTACHMENT ADAPTOR AND COVER FOR SAME

FIELD OF THE INVENTION

This invention generally relates to hand tools and more particularly to routers and even more particularly to attachments for routers.

BACKGROUND OF THE INVENTION

A router is a well-known rotary cutting tool for routing a work piece. Typically, a router has a rotating bit, which is used to cut material such as wood. It is often desirable to attach attachments to the router. For instance, the router could be attached to a base that includes handles for improved manipulation of the router. Alternatively, the router could be attached to attachments that improve the functionality such as circle compasses or devices for allowing the router to cut a straight slot in a piece of wood.

It is often important to have a smooth surface for the router to slide on the work piece. Thus, it can be advantageous to cover any mounting structure use to attach the attachment to the router.

The present application is directed toward improvements over the prior art and particularly improvements for attachments for routers.

BRIEF SUMMARY OF THE INVENTION

Embodiments provide a new and improved attachment for a router.

In an example, an attachment for a router includes a frame arrangement, a bottom cover, and a rotation mounting arrangement between the frame and the bottom cover. The frame arrangement has a top side and a bottom side. The top side generally faces the router, when attached thereto, and the bottom side generally faces away from the router. The frame arrangement has an outer rim, a central hub and a mounting portion. The outer rim has a rim bottom most extent. The central hub is located radially inward of the outer rim. The central hub has a hub bottom most extent. The central hub defines an opening configured to receive the bit therethrough along a central axis when the router is attached to the top side of the frame arrangement. The mounting portion extends radially between the outer rim and the central hub. The mounting portion has at least one mounting aperture therethrough. The bottom cover is removably mountable to the frame arrangement radially between the central hub and the outer rim. The bottom cover covers the mounting portion. The rotation mounting arrangement is provided in part by a first portion provided by the bottom cover and is provided in part by a second portion provided by the frame arrangement. The rotation mounting arrangement has a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement.

In one example, the first and second orientations are angular orientations about the central axis.

In one example, the bottom cover is in a first angular position about the central axis relative to the frame arrangement in the first orientation and is in a second angular position about the central axis relative to the frame arrangement in the second orientation. The bottom cover is rotated relative to the frame arrangement about the central axis between the first and second orientations.

In one example, the first portion of the rotation mounting arrangement includes a first tab provided by the bottom cover. The second portion of the rotation mounting arrangement includes a second tab provided by the outer rim. The first and second tabs being angularly aligned with one another in the second orientation with the second tab being positioned axially further from the top side of the frame arrangement than the first tab.

In one example, the first tab has a first tab axially outward facing abutment surface that is axially offset from a bottom most surface of the bottom cover. The second tab has an axially inward facing abutment surface that is axially offset from the bottom most extent of the outer rim. The axially outward facing abutment surface faces the axially inward facing abutment surface in the second orientation.

In one example, the rotation mounting arrangement includes a first angular abutment provided by the bottom cover and a second angular abutment provided by the frame arrangement. The first and second angular abutments angularly abut when the bottom cover is in the second orientation. The first and second angular abutments limit angular rotation of the bottom cover relative to the frame arrangement preventing the first tab of the bottom cover from rotating past the second tab of the frame arrangement after the bottom cover transitions to the second orientation from the second orientation.

In one example, a locking member, in a locked configuration, extends axially from the bottom cover and into a cavity in the frame arrangement to prevent rotation of the bottom cover from the second orientation to the first orientation.

In one example, the locking member extends from one of the bottom cover and the frame arrangement into a cavity formed in the other one of the frame arrangement and the bottom cover. The locking member is removable from the cavity to permit rotation of the bottom cover relative to the frame arrangement.

In one example, the outer rim includes a first axially extending notch angularly offset from the second tab. The outer rim includes a first relief axially above the second tab connected to the first axially extending notch. The first tab aligns with the first axially oriented notch and is axially movable within the first axially oriented notch in the first orientation. The first tab is located within the first relief in the second orientation.

In one example, the first axially extending notch and the first relief are connected such that, when the bottom cover is rotated about the central axis to transition between the first and second orientations, the first tab moves angularly from the first axially extending notch into the first relief.

In one example, in the second orientation, the bottom cover axially abuts the mounting portion.

In one example, the frame arrangement defines an axial recess that is recessed relative to a bottom most extent of the outer rim. The bottom cover includes a body portion that is axially received, at least in part, within the axial recess when in the second orientation. The outer rim defines an outer radial periphery. The bottom cover is positioned entirely radially inward of the outer radial periphery of the outer rim.

In one example, the axial recess is recessed relative to a bottom most extent of the central hub.

In one example, the first portion of the rotation mounting arrangement extends radially relative to the body portion of the bottom cover.

In one example, a locking member, in a locked configuration relative to the bottom cover and frame arrangement, prevents rotation of the bottom cover from the second orientation to the first orientation.

In one example, the locking member is in the form of a screw that extends through the bottom cover and threads into the frame arrangement when in the second orientation.

In one example, the mounting portion includes a first spoke that is moveable relative to the central hub and outer rim about the central axis such that a position of the first spoke relative to outer rim is adjustable. The first spoke including the mounting aperture.

In one example, the mounting portion includes a second spoke that is fixed between the outer rim and central hub. The second spoke includes a second mounting aperture. The first spoke is angularly repositionable about the central axis to change a position of the mounting aperture of the first spoke relative to the second mounting aperture second spoke.

In one example, the attachment is an adaptor for mounting the router to another component. The frame arrangement includes a portion of a second rotation mounting arrangement for rotationally connecting the frame arrangement to another component.

In an example, an adaptor attachment for a router having a bit is provided. The adaptor attachment is configured to attach the router to another component. The adaptor attachment includes a frame arrangement. The frame arrangement has a top side and a bottom side and a bit aperture extending through the frame and defining a central axis. The frame arrangement has an outer rim having a first portion of a first rotational mounting arrangement configured to rotationally attach the frame arrangement to another component. The frame arrangement has a mounting portion extending radially inward from the outer rim. The mounting portion has at least one mounting aperture therethrough. The adaptor attachment includes a bottom cover removably mountable to the frame arrangement to cover the mounting portion. A second rotation mounting arrangement has a first portion provided by the bottom cover and a second portion provided by the frame arrangement. The rotation mounting arrangement having a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement.

In one example, the first portion of the first rotational mounting arrangement includes an axially facing abutment surface that faces in a direction that extends away from the bottom side of the frame arrangement.

In an example, an attachment for router is provided. The attachment includes a frame arrangement, a bottom cover, and first and second rotation mounting portions. The frame arrangement has a top side and a bottom side. The frame arrangement has an outer rim. The frame arrangement has a mounting portion attached to the outer rim. The mounting portion has at least one mounting aperture therethrough. The mounting portion is positioned radially inward of the outer rim. The bottom cover is removably mountable to the frame arrangement. The bottom cover covers the mounting portion with the mounting portion being closer to the router than the adjacent portion of the bottom cover when mounted to the router. The first rotation mounting portion is provided by the bottom cover. The second rotation mounting portion is provided by the frame arrangement. The first rotation mounting portion has a first orientation relative to the second rotation mounting portion wherein the bottom cover may be axially positionable relative to the frame arrangement parallel to the central axis. The first rotation mounting portion has a second orientation relative to the second rotation mounting portion wherein the first rotation mounting portion is angularly aligned with the second rotation mounting portion and the first rotation mounting portion axially abuts the second rotation mounting portion such that the bottom cover may not be removed from the frame arrangement axially parallel to the central axis and the bottom cover is axially secured to the frame arrangement.

In one example, the outer rim has a radially outward extending tab forming part of a rotation mounting arrangement for attaching the frame arrangement to another component that is different than the router and different from the bottom cover such that the attachment forms an adaptor attachment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
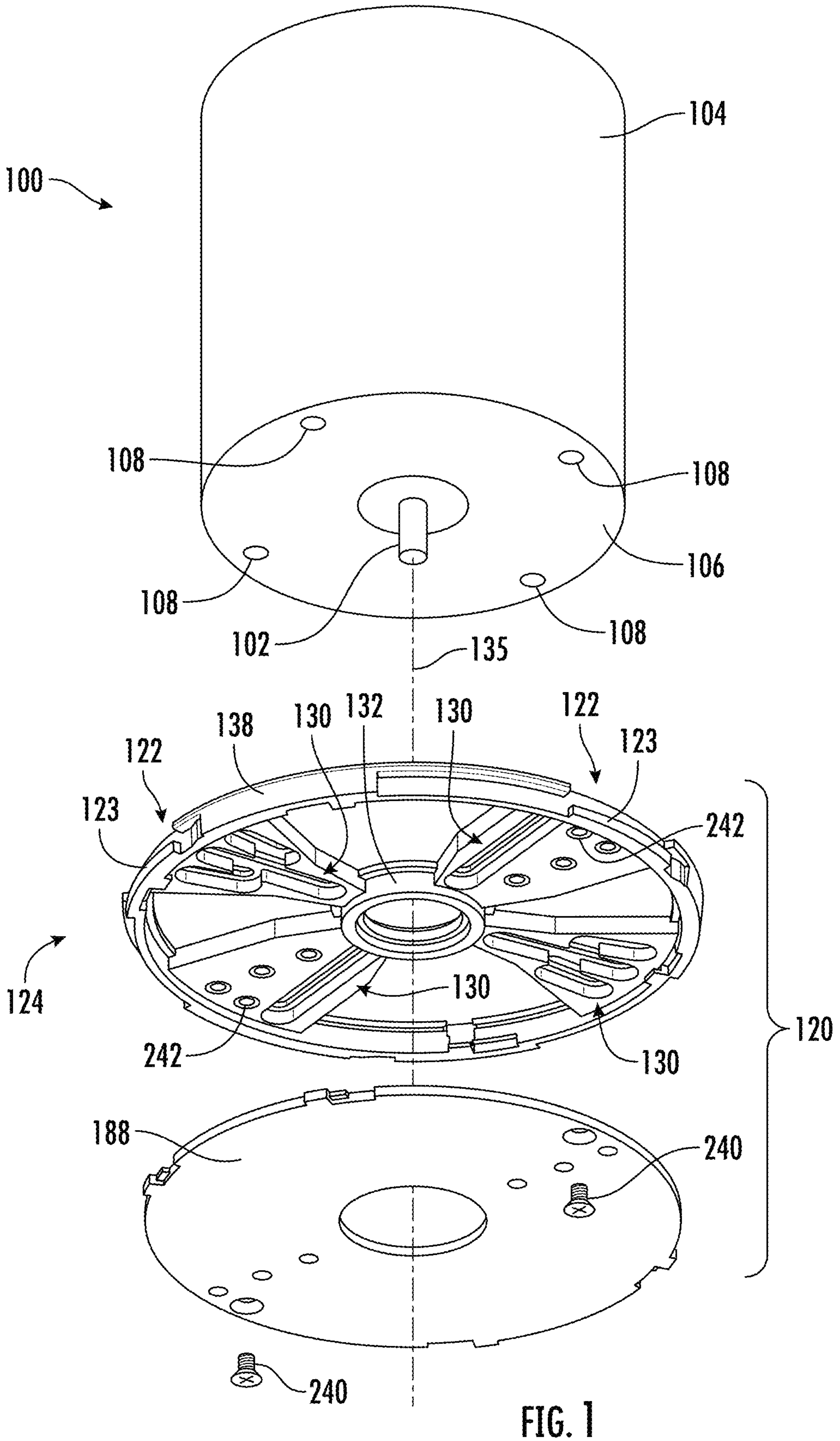
FIG. 1 is a perspective exploded illustration of a router and router attachment according to an embodiment of the application.
Figure 2:
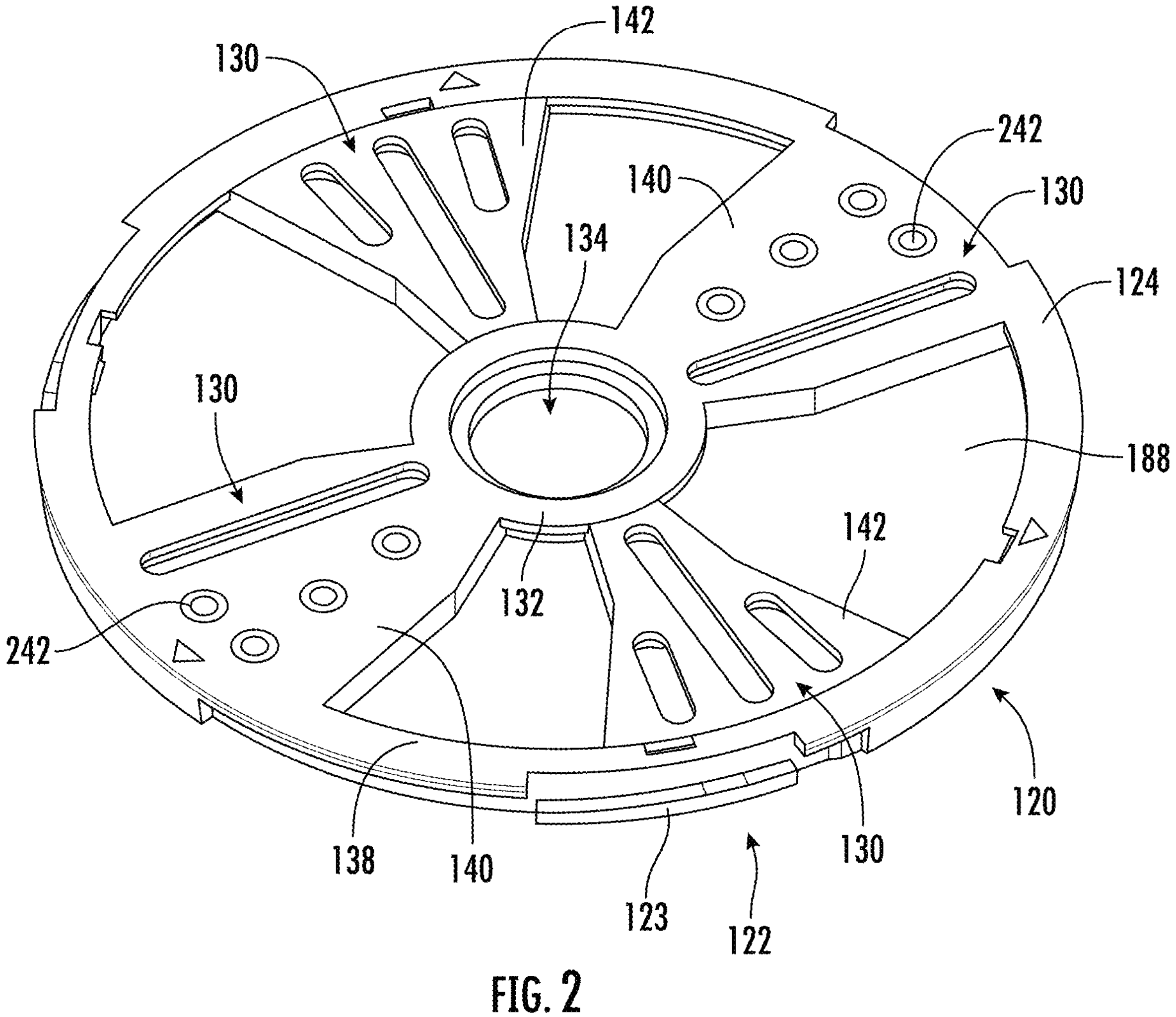
FIG. 2 is a top perspective illustration of the router attachment of FIG. 1.

FIG. 1 illustrates a schematic router 100 that includes a rotating bit 102. The router 100 includes a housing 104 that may house the motor and electronics for the router 100.

A bottom end 106 of the router 100 includes a plurality of mounting apertures 108. Typically, the mounting apertures 108 are threaded for receipt of bolts/screws to attach attachment 120 to the router 100 and particularly the housing 104 thereof. While the illustrated router 100 includes four (4) mounting apertures 108 other routers could have a different number of mounting apertures 108 and/or a different pattern of the mounting apertures 108. It is typical for individual manufactures to have their own distinct pattern and/or orientation. As there are a large number of manufacturers that manufacture various different routers, a large number of patterns for the mounting apertures in the industry exist.

FIG. 1 illustrates an attachment 120 for router 100 in the form of an adaptor attachment (also referred to herein as "adaptor 120") that can be attached proximate the bottom end 106 of the router 100. The adaptor 120 includes a portion of a first rotational mounting arrangement 122 illustrated in the form of a plurality of radially extending tabs 123. The portion of the first rotational mounting arrangement 122 would cooperate with a portion of the first rotational mounting arrangement 122 provided by another device to which the router 100 is to be attached. For example, the user may desire to attach the router 100 to another device such as a router base that includes handles, a circle compass, a router guide, or other components that could be used in a fixed relation to the router 100. The adaptor 120 allows for quick attachment and detachment of the router 100 to/from the other device.

In use, the user would rotationally engage the different portions of the first rotational mounting arrangement by rotating the adaptor 120 and associated portion of the first rotational mounting arrangement 122 relative to the corresponding portion of the device to which the router 100 is being attached.

The adaptor 120 includes a frame arrangement 124 that include the first rotational mounting arrangement 122.

The adaptor 120 is designed to be able to be attached to a large number of routers 100, regardless of the pattern of the mounting apertures 108. In this embodiment, the adaptor 120 includes a mounting portion that include mounting apertures in the form of mounting slots 130 through which bolts/screws can extend that will thread into mounting apertures 108 of the router. The bolts/screws will secure the adaptor 120 to the router 100.

The frame arrangement 124 defines a central hub 132 that defines a central aperture 134 through which the bit 102 extends. The frame arrangement 124 also includes an outer rim 138 that surrounds the central hub 132. The mounting slots 130 are angularly spaced around the central hub 132 and generally radially interposed between the central hub 132 and outer rim 138.

The mounting portion in this example is provided by a plurality of radially extending spoke members through which the mounting slots 130 are formed.

In this example, the spoke members include radially extending permanent spoke members 140 and radially extending adjustable spoke members 142. Permanent spoke members 140 are permanently attached to the central hub 132 and outer rim 138, e.g. molded with the central hub 132 and outer rim 138 in fixed orientations relative to the central hub 132 and outer rim 138. However, other embodiments could have the permanent spoke members formed as separate components that are otherwise affixed to the central hub 132 and outer rim 138.

Adjustable spoke members 142 are movable components, and preferably removable components, that do not have a fixed orientation relative to the central hub 132, outer rim 138 or the permanent spoke members 140. Some embodiments could have only permanent spoke members 140. Some embodiments could have only adjustable spoke members 142.

Figure 3:
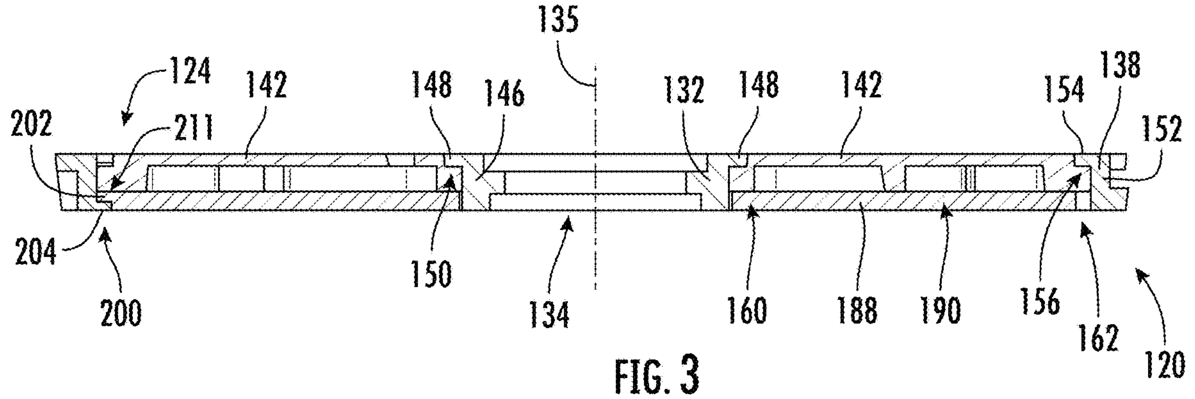
FIG. 3 is a cross-sectional illustration of the router attachment.

With reference to FIG. 3, the central hub 132 and outer rim 138 each have a generally stepped profile that engage with corresponding ends of the adjustable spoke members 142 while allowing for adjusting the angular position of the adjustable spoke members 142 about the central aperture 134 and a central axis 135 defined by the central aperture 134. More particularly, the central hub 132 includes an annular wall portion 146 and a radially outward extending flange 148 that defines a stepped region 150. Similarly, the out rim 138 includes an annular wall portion 152 and a radially inward extending flange 154 that defines a stepped region 156.

The radially inner end 160 and radially outer end 162 of the adjustable spoke members 142 are configured to cooperate with the central hub 132 and outer rim 138, respectively, to axially locate the adaptor 120 to the router 100. More particularly, the adjustable spoke members 142 will clamp the adaptor 120 and particularly the frame arrangement 124 to the bottom end 106 of the router.

The adaptor 120 includes bottom cover 188. The cover 188 forms a smooth planar surface to allow the router adaptor 120 to slide over a work piece. Cover 188 also covers the spokes 140, 142.

The cover 188 is attached to the frame arrangement 124 by axially inserting at least portion a body portion of the bottom cover 188 into a recess 190 formed by the frame arrangement 124 and then rotating the cover 188 relative to the frame arrangement 124.

The recess 190 is generally formed by the central hub 132, outer rim 138 and the spokes 140, 142. Here, recess 190 is recessed from the bottom most extent of the central hub 132 and the outer rim 138. As such, in this example, the bottom cover is positioned radially between the central hub 132 and the outer rim 138. However, not all examples need to have a central hub.

Further, the bottom cover 188 is preferably entirely radially inward of an outer radial periphery of the outer rim 138, e.g. an outer radial periphery defined by sidewall 152.

In general, the thickness of the cover 188 is substantially equal to the recess 190 to provide a flush arrangement between the bottom cover 188 and the bottom most extent of one or both of the central hub 132 and outer rim 138.

A second a rotation mounting arrangement 200 is provided between the cover 188 and the frame arrangement 124. The rotation mounting arrangement 200 is provided in part by a first portion provided by the bottom cover 188 and provided in part by a second portion provided by the frame arrangement 124. The rotation mounting arrangement 200 has a first angular orientation wherein the bottom cover 188 may be axially positionable relative to the frame arrangement 124 (see FIGS. 7 and 8) parallel to the central axis 135 and a second orientation (see FIGS. 3-6) wherein the bottom cover 188 may not be removed from the frame arrangement 124 axially parallel to the central axis 135. As such, in the second orientation, the bottom cover 188 is axially secured to the frame arrangement 124.

In this example, the first portion of the rotation mounting arrangement 200 includes a first tab 202 provided by the bottom cover 188. The second portion of the rotation mounting arrangement 200 includes a second tab 204 provided by the outer rim 138.

In one example, the first tab 202 extends radially from the body portion of the bottom cover 188. In this example, the vertical thickness (e.g. parallel to the axis 135) is less than a vertical thickness of the body portion from which the first tab 202 extends.

Figure 7:
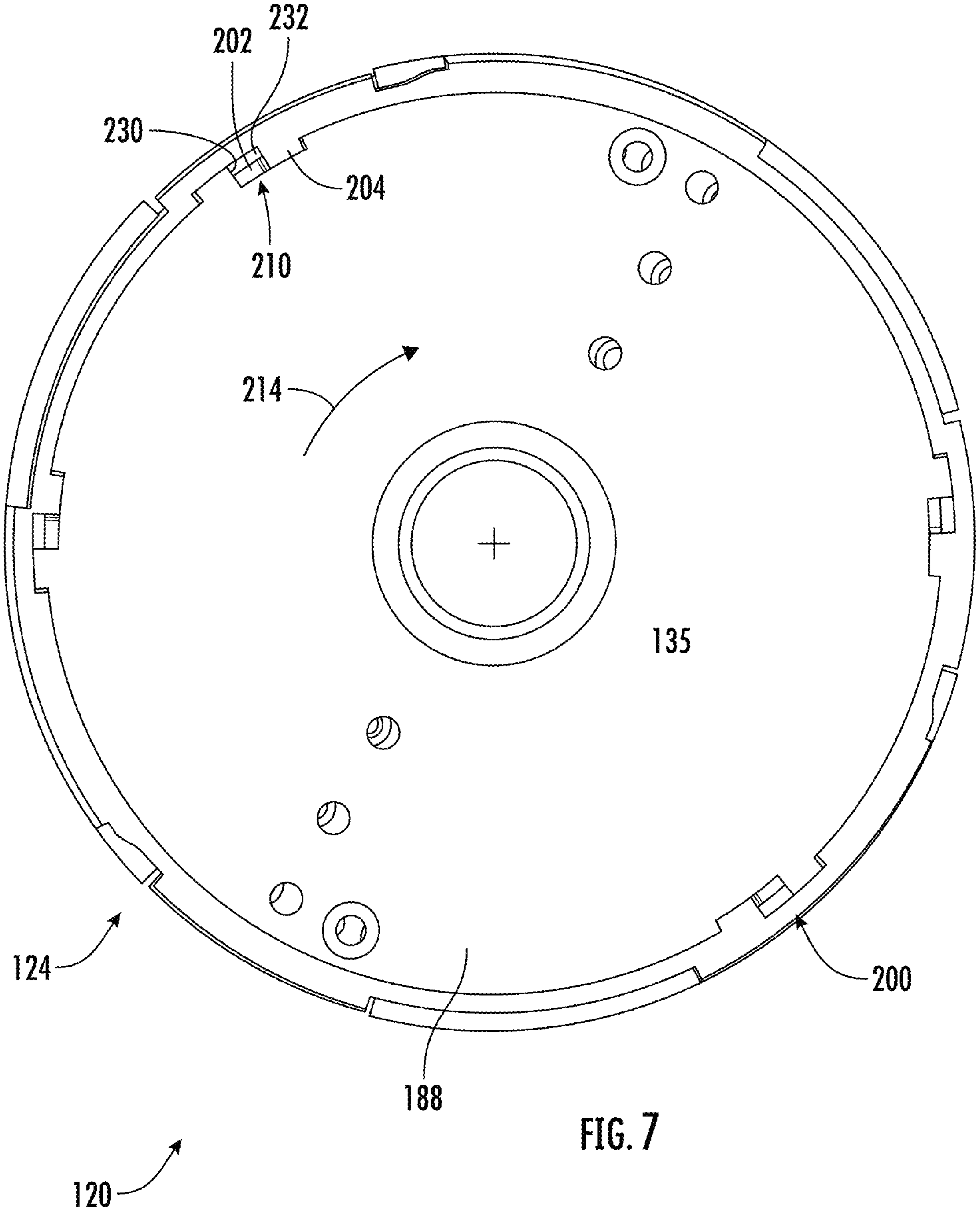
FIG. 7 is a bottom perspective illustration of the router attachment with the bottom cover illustrated in the first angular orientation relative to the frame arrangement in which it can be removed form the frame arrangement.
Figure 8:
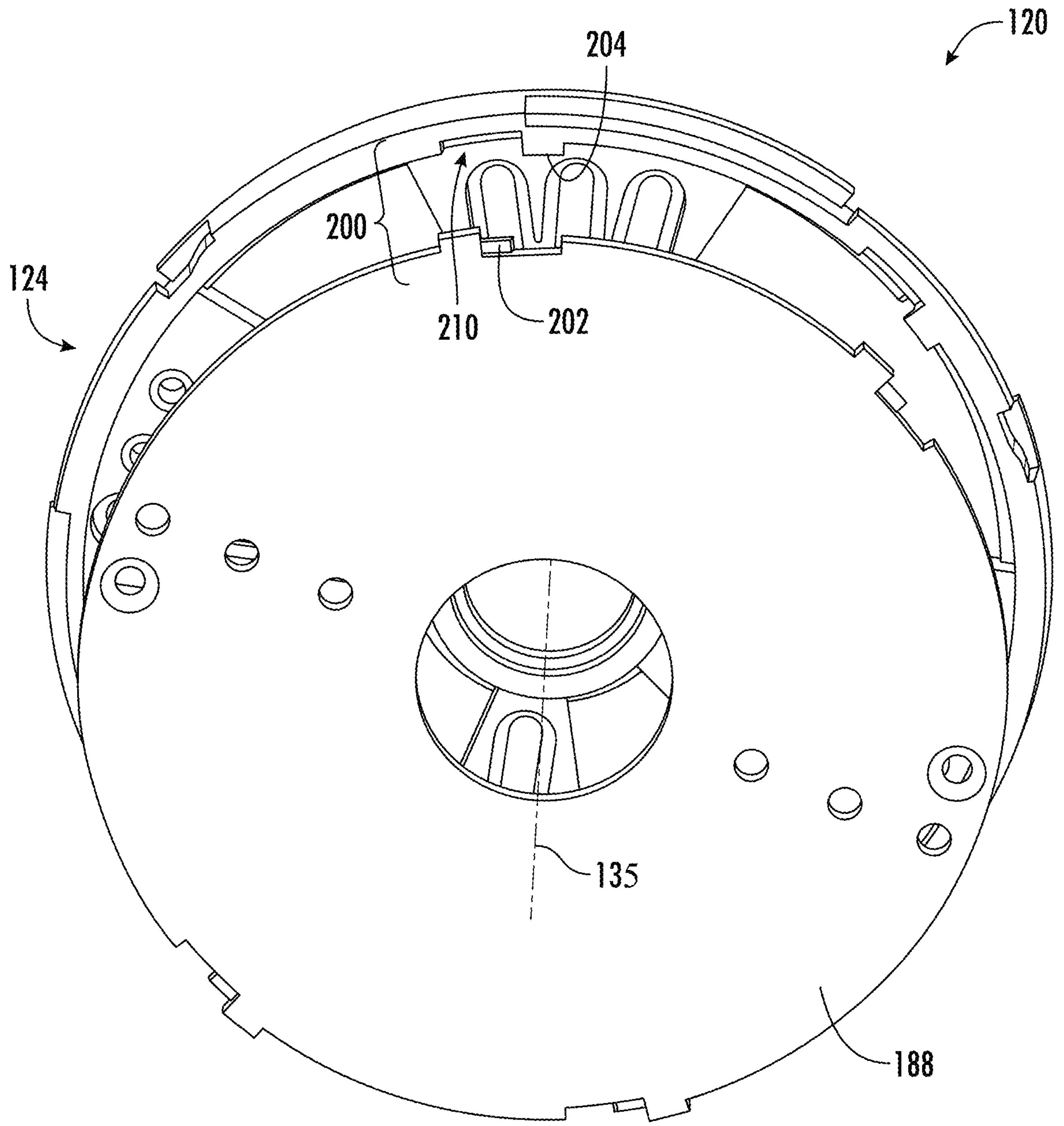
FIG. 8 is a bottom exploded illustration with the bottom cover illustrated in the first angular orientation relative to the frame arrangement.

The first and second tabs 202, 204 are angularly offset from one another about axis 135 in the first orientation (see e.g. FIGS. 7 and 8). The first and second tabs 202, 204 are angularly aligned with one another in the second orientation with the second tab 204 being positioned axially further from the top side of the frame arrangement 124 than the first tab 202 (see e.g. FIG. 5).

The frame arrangement 124 and particularly the outer rim 138 includes an axially extending notch 210 angularly offset from the second tab 204 that allows for the axial movement of the bottom cover 188 and the first tab 202 when in the first orientation. A relief region 211 (see FIG. 5) is located above the second tab 204 in which the first tab 202 is located when in the second orientation. The relief region 211 is connected to notch 210.

The tab 202 is generally located in notch 210 in the first orientation and located in relief region 211 in the second orientation.

In this example, the cover 188 is rotated from the first angular position to the second angular position by rotating in the direction 214 illustrated in FIG. 7. This movement axially secures the cover 188 to the frame arrangement 124 via the first and second tabs 202, 204.

Figure 4:
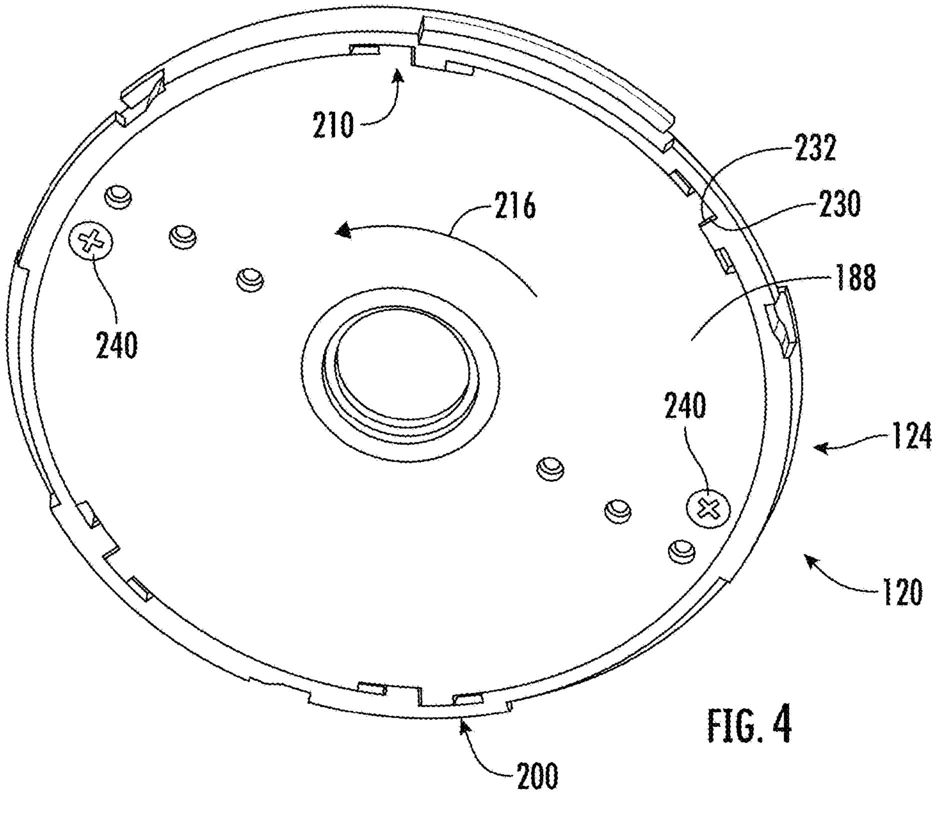
FIG. 4 is a bottom perspective illustration of the router attachment in a second angular orientation with a bottom cover thereof secured to a frame arrangement thereof.
Figure 5:
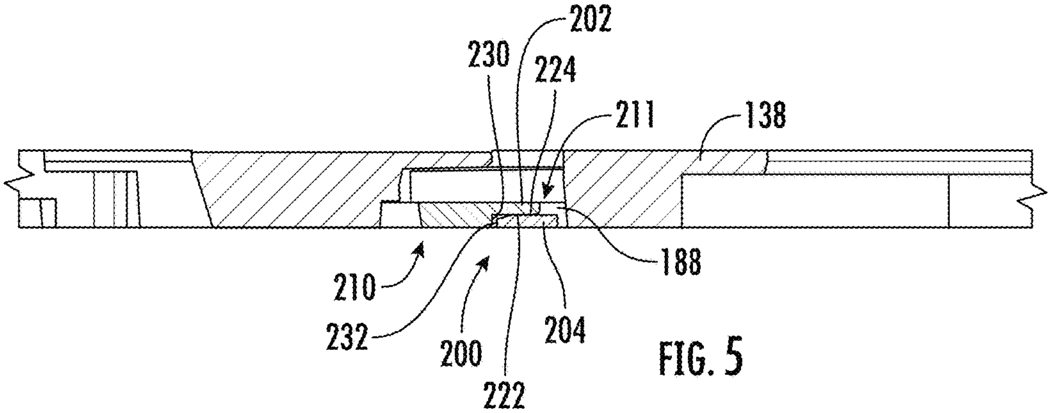
FIG. 5 is a further cross-sectional illustration of a portion of the router attachment illustrating a portion of a rotational mounting arrangement securing the bottom cover to the frame arrangement.
Figure 6:
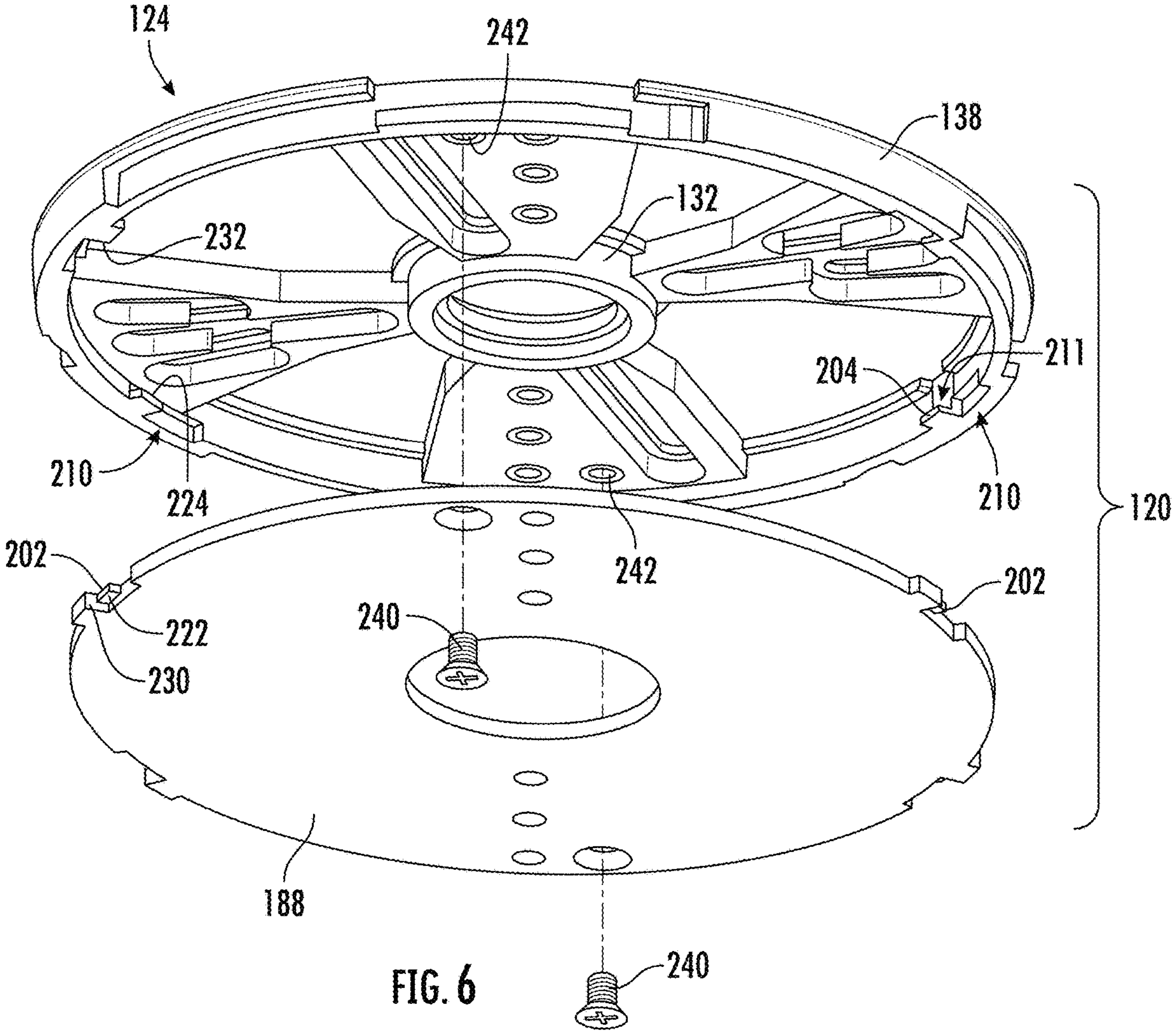
FIG. 6 is an exploded illustration of the router attachment with the cover illustrated in the second angular orientation relative to the frame arrangement.

Conversely, the cover 188 is rotated from the second angular to the first angular orientation by rotating in the direction 216 illustrated in FIG. 4. This movement disengages the first and second tabs 202, 204 and permits axially moving the cover 188 and removing it from frame arrangement 124.

When mounting the cover 188, it is first axially transitioned toward the frame arrangement 124 (e.g. in a direction extending toward a top side of the frame arrangement 124) with first tab 202 angularly aligned with notch 210. Once tab 202 is positioned axially within the notch 210, the cover 188 can be rotated about axis 135 in the direction illustrated by arrow 214 relative to frame arrangement 124 to angularly align first and second tabs 202, 204. The reverse action can be used to remove the cover 188 from the frame arrangement 124.

In the second arrangement, the first tab 202 is closer to the top of the frame arrangement than the second tab 204.

The first tab 202 has a first tab axially outward facing abutment surface 222 that is axially offset from a bottom most surface of the bottom cover 188. The second tab 204 has an axially inward facing abutment surface 224 that is axially offset from the bottom most extent of the outer rim 138. The axially outward facing abutment surface 222 facing the axially inward facing abutment surface 224 in the second orientation.

The axially outward facing abutment surface 222 of the first tab 202 is axially offset from the bottom most surface of the bottom cover.

The offset distance maybe substantially equal to the thickness of the second tab 204. Thus, the bottom of the second tab 204 may be flush with the bottom surface of the cover 188.

The rotation mounting arrangement 200 includes a first angular abutment 230 provided by the bottom cover 188 and a second angular abutment 232 provided by the frame arrangement 124. The first and second angular abutments 230, 232 angularly abut when the bottom cover 188 is in the second orientation. The abutments 230, 232 limit angular rotation of the bottom cover 188 relative to the frame arrangement 124 preventing the first tab 202 of the bottom cover 188 from rotating past the second tab 204 of the frame arrangement 124 as the bottom cover 188 transitions from the first orientation to the second orientation.

To prevent inadvertently rotating from the second orientation to the first orientation, the adaptor 120 includes a locking member illustrated in the form of screw 240. In a locked configuration (e.g. an inserted configuration), the screw 240 extends axially from the bottom cover 188 and into a cavity 242 (a threaded cavity in this example) in the frame arrangement 124 to prevent rotation of the bottom cover 188 relative to the frame arrangement 124 from the second orientation to the first orientation.

Two such screws and cavities are provided in the illustrated example. Other locking members are contemplated such as spring loaded projections or detents could be used. Further, the locking member could operate in the opposite direction. The locking member prevents angular rotation about axis 135 when in the locked configuration.

In the illustrated example, the top side of the bottom cover 188 (e.g. inner side) axially abuts a bottom side of the spokes 140, 142. This provides support to the bottom cover 188.

While the bottom cover 188 is illustrated used in an adaptor attachment for a router. The cover could be used directly with other router attachments. For example, if a handle attachment is secured to the bottom of the router, such as illustrated in U.S. Pat. No. 11,173,624, the teachings and disclosures thereof incorporated herein by reference thereto, the cover could be used in such an attachment. Other attachments are contemplated such as a circle compass or guide arrangement for guiding motion of a router.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An attachment for a router having a bit, the attachment comprising:

a frame arrangement having a top side and a bottom side, the frame arrangement having:

an outer rim having a rim bottom most extent;

a central hub located radially inward of the outer rim, the central hub having a hub bottom most extent, the central hub defining an opening configured to receive the bit therethrough along a central axis when the router is attached to the top side of the frame arrangement;

an axial recess axially recessed relative to the bottom most extent of the outer rim and bottom most extent of the central hub, the axial recess being radially between a radially outward facing surface of the central hub and a radially inward facing surface of the outer rim;

a mounting portion extending radially between the outer rim and the central hub, the mounting portion having at least one mounting aperture therethrough;

a bottom cover removably mountable to the frame arrangement radially between the central hub and the outer rim, the bottom cover covering the mounting portion, the bottom cover including a body portion;

a rotation mounting arrangement provided in part by a first portion provided by the bottom cover and provided in part by a second portion provided by the frame arrangement, the rotation mounting arrangement having a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement, the body portion of the bottom cover being axially received, at least in part, within the axial recess and radially between the central hub and the outer rim when in the second orientation.

2. The attachment of claim 1, wherein the bottom cover is in a first angular position about the central axis relative to the frame arrangement in the first orientation and is in a second angular position about the central axis relative to the frame arrangement in the second orientation, the bottom cover being rotated relative to the frame arrangement about the central axis between the first and second orientations.

3. The attachment of claim 1, wherein:

the first portion of the rotation mounting arrangement includes a first tab provided by the bottom cover;

the second portion of the rotation mounting arrangement includes a second tab provided by the outer rim; and the first and second tabs being angularly aligned with one another in the second orientation with the second tab being positioned axially further from the top side of the frame arrangement than the first tab.

4. The attachment of claim 1, wherein:

the first tab has a first tab axially outward facing abutment surface that is axially offset from a bottom most surface of the bottom cover;

the second tab having an axially inward facing abutment surface that is axially offset from the bottom most extent of the outer rim;

the axially outward facing abutment surface facing the axially inward facing abutment surface in the second orientation.

5. The attachment of claim 3, wherein the rotation mounting arrangement includes a first angular abutment provided by the bottom cover and a second angular abutment provided by the frame arrangement, the first and second angular abutments angularly abut when the bottom cover is in the second orientation and limiting angular rotation of the bottom cover relative to the frame arrangement preventing the first tab of the bottom cover from rotating past the second tab of the frame arrangement after the bottom cover transitions to the second orientation from the first orientation.

6. The attachment of claim 5, further comprising a locking member that, in a locked configuration, extends axially engages the bottom cover and the frame arrangement preventing angular rotation of the bottom cover from the second orientation to the first orientation.

7. The attachment of claim 6, wherein the locking member extends from one of the bottom cover and the frame arrangement into a cavity formed in the other one of the frame arrangement and the bottom cover, the locking member being removable from the cavity to permit rotation of the bottom cover relative to the frame arrangement.

8. An attachment for a router having a bit, the attachment comprising:

a frame arrangement having a top side and a bottom side, the frame arrangement having:

an outer rim having a rim bottom most extent;

a central hub located radially inward of the outer rim, the central hub having a hub bottom most extent, the central hub defining an opening configured to receive the bit therethrough along a central axis when the router is attached to the top side of the frame arrangement;

a mounting portion extending radially between the outer rim and the central hub, the mounting portion having at least one mounting aperture therethrough;

a bottom cover removably mountable to the frame arrangement radially between the central hub and the outer rim, the bottom cover covering the mounting portion;

a rotation mounting arrangement provided in part by a first portion provided by the bottom cover and provided in part by a second portion provided by the frame arrangement, the rotation mounting arrangement having a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement;

wherein:

the first portion of the rotation mounting arrangement includes a first tab provided by the bottom cover;

the second portion of the rotation mounting arrangement includes a second tab provided by the outer rim;

the first and second tabs being angularly aligned with one another in the second orientation with the second tab being positioned axially further from the top side of the frame arrangement than the first tab;

the outer rim includes a first axially extending notch angularly offset from the second tab;

the outer rim includes a first relief axially above the second tab connected to the first axially extending notch;

the first tab aligning with the first axially oriented notch and axially movable within the first axially oriented notch in the first orientation; and the first tab located within the first relief in the second orientation.

9. The attachment of claim 8, wherein:

the first axially extending notch and the first relief are connected such that when the bottom cover is rotated about the central axis to transition between the first and second orientations, the first tab moves angularly from the first axially extending notch into the first relief.

10. The attachment of claim 1, wherein in the second orientation, the bottom cover axially abuts the mounting portion.

11. The attachment of claim 1, wherein:

the outer rim defines an outer radial periphery; and the bottom cover is positioned entirely radially inward of the outer radial periphery of the outer rim.

12. The attachment of claim 11, wherein the bottom cover defines a central aperture, the central hub extending axially into the central aperture of the bottom cover;

the cover being flush with or recessed within the axial recess relative to the bottom most extent of the outer rim;

the cover being flush with or recessed within the axial recess relative to the bottom most extent of the central hub.

13. The attachment of claim 11, wherein the first portion of the rotation mounting arrangement extends from the body portion of the bottom cover.

14. An attachment for a router having a bit, the attachment comprising:

a frame arrangement having a top side and a bottom side, the frame arrangement having:

an outer rim having a rim bottom most extent;

a central hub located radially inward of the outer rim, the central hub having a hub bottom most extent, the central hub defining an opening configured to receive the bit therethrough along a central axis when the router is attached to the top side of the frame arrangement;

a mounting portion extending radially between the outer rim and the central hub, the mounting portion having at least one mounting aperture therethrough;

a bottom cover removably mountable to the frame arrangement radially between the central hub and the outer rim, the bottom cover covering the mounting portion;

a rotation mounting arrangement provided in part by a first portion provided by the bottom cover and provided in part by a second portion provided by the frame arrangement, the rotation mounting arrangement having a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement;

a locking member that has a locked configuration relative to the bottom cover and frame arrangement in which the locking member prevents rotation of the bottom cover from the second orientation to the first orientation; and wherein the locking member is in the form of a screw that extends through the bottom cover and threads into the frame arrangement when in the second orientation.

15. The attachment of claim 1, wherein the mounting portion includes a first spoke that is moveable relative to the central hub and outer rim about the central axis such that a position of the first spoke relative to outer rim is adjustable, the first spoke including the mounting aperture.

16. The attachment of claim 15, wherein the mounting portion incudes a second spoke that includes a second mounting aperture, the second spoke is fixed between the outer rim and central hub, the first spoke is angularly repositionable about the central axis to change an angular spacing of the mounting aperture of the first spoke relative to the mounting aperture of the second spoke.

17. An adaptor attachment for a router having a bit, the adaptor attachment configured to attach the router to another component, the adaptor attachment comprising:

a frame arrangement having a top side and a bottom side and a bit aperture extending through the frame and defining a central axis, the frame arrangement having:

an outer rim having a first portion of a first rotational mounting arrangement configured to rotationally attach the frame arrangement to the another component;

a mounting portion extending radially inward from the outer rim, the mounting portion having at least one mounting aperture therethrough;

a bottom cover removably mountable to the frame arrangement to cover the mounting portion;

a second rotation mounting arrangement having a first portion provided by the bottom cover and having a second portion provided by the frame arrangement, the rotation mounting arrangement having a first orientation wherein the bottom cover may be axially positionable relative to the frame arrangement parallel to the central axis and a second orientation wherein the bottom cover may not be removed from the frame arrangement axially parallel to the central axis and is axially secured to the frame arrangement.

18. The adaptor attachment of claim 17, wherein the first portion of the first rotational mounting arrangement includes an axially facing abutment surface that faces in a direction that extends away from the bottom side of the frame arrangement.

19. An attachment for router, the attachment comprising:

a frame arrangement having a top side and a bottom side, the frame arrangement having:

an outer rim;

a mounting portion attached to the outer rim, the mounting portion having at least one mounting aperture therethrough;

a bottom cover removably mountable to the frame arrangement, the bottom cover covering the mounting portion with the mounting portion being closer to the router than the adjacent portion of the bottom cover when mounted to the router;

a first rotation mounting portion provided by the bottom cover;

a second rotation mounting portion provided by the frame arrangement, the first rotation mounting portion having a first orientation relative to the second rotation mounting portion wherein the bottom cover may be axially positionable relative to the frame arrangement parallel to the central axis, the first rotation mounting portion having a second orientation relative to the second rotation mounting portion wherein the first rotation mounting portion is angularly aligned with the second rotation mounting portion and the first rotation mounting portion axially abuts the second rotation mounting portion such that the bottom cover may not be removed from the frame arrangement axially parallel to the central axis and the bottom cover is axially secured to the frame arrangement; and wherein:

the bottom cover includes a first angular abutment;

the frame arrangement includes a second angular abutment; and first and second angular abutments angularly abut when the bottom cover is in the second orientation, the first and second angular abutments preventing the first rotation mounting portion from rotating past the second rotation mounting portion when the bottom cover is rotated in a direction to transition from the first orientation to the second orientation.

20. The attachment of claim 19, wherein the outer rim has a radially outward extending tab forming part of a rotation mounting arrangement for attaching the frame arrangement to another component that is different than the router and different from the bottom cover such that the attachment forms an adaptor attachment.

21. The attachment of claim 19, further comprising a locking member that has a locked configuration relative to the bottom cover and frame arrangement in which the locking member prevents rotation of the bottom cover from the second orientation to the first orientation.

* * * * *